A. W. THOMAS.
Assignor, by direct and mesne assignments, to THE THOMAS INFLATABLE TIRE COMPANY.
TIRE FOR VEHICLE WHEELS.
No. 11,155. Reissued Apr. 7, 1891.
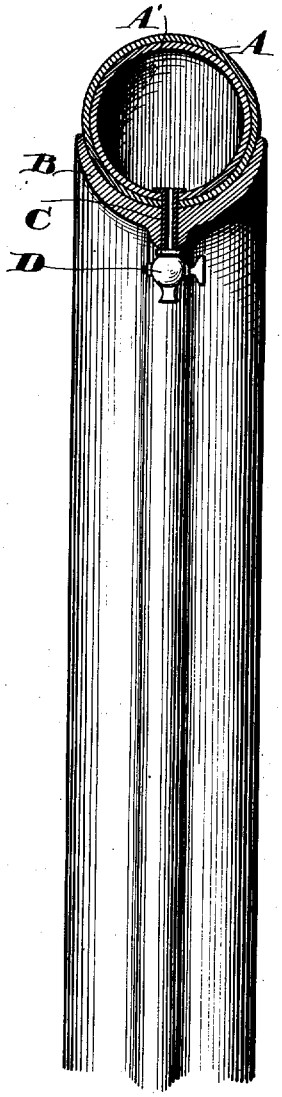
Witnesses:
Henry Drury
Walter Tamaniss.
Inventor:
Amos W. Thomas
by his atty.
Francis T. Chambers

BEST AVAILABLE COPY

UNITED STATES PATENT OFFICE.

AMOS W. THOMAS, OF PHILADELPHIA, PENNSYLVANIA, ASSIGNOR, BY DIRECT AND MESNE ASSIGNMENTS, TO THE THOMAS INFLATABLE TIRE COMPANY.

TIRE FOR VEHICLE-WHEELS.

SPECIFICATION forming part of Reissued Letters Patent No. 11,155, dated April 7, 1891

Original No. 399,356, dated March 12, 1889. Application for reissue filed December 15, 1890. Serial No. 375,049.

*To all whom it may concern:*

Be it known that I, AMOS W. THOMAS, a citizen of the United States, residing at the city of Philadelphia, in the county of Philadelphia and State of Pennsylvania, have invented certain new and useful Improvements in Tires for the Wheels of Vehicles, of which the following is a specification.

My invention relates to tires composed of compressible or elastic material as opposed to metal and such as are capable of being inflated by air, gas, water, or other aeriform or gaseous fluid or liquid.

My invention is, in general, applicable to the road-wheels of carriages or other rolling conveyances, but, however, more especially applicable to the road-wheels of bicycles, tricycles, and velocipedes of all varieties.

The principal object of my present invention is to render such a tire more flexible and likewise more readily compressible in its passage over irregularities in the roadway, while at the same time strong, durable, and serviceable.

My invention consists in forming a tire of two or more concentric tubes, made of elastic or compressible material, fitting closely to and lying nested within each other, with smooth unjointed contact surfaces so that each tube may be capable of an independent "creeping" movement with respect to its neighbor; also, in supplying suitable means whereby such a tire may be inflated after it has been secured to place upon a wheel. These results may be accomplished by constructing the tire of tubular form and composing it of two or more tubes of rubber, leather, treated fabric, or other suitable material, with the outer tube made upon its tread or unprotected portion without joint or seam, and also preferably, and especially upon its said tread portion, made of tougher material than the inner tube or tubes. The inner tube of the series, made of an impervious material, should be preferably fluid-tight.

In the accompanying drawing I have illustrated a tire embodying the characteristic features of my invention, in transverse section, as applied to a groove-faced metal felly of the character employed in bicycles and other analogous rolling conveyances, a portion of the felly having been shown partly in section and in elevation.

Referring to the drawing, A is the outer tube, made of rubber or other suitable material and having a continuous smooth interior surface. The tread portion of said tube being, in its manufacture, also preferably made tougher than the portion facing the felly.

A′ is the inner and enveloped tube. It is made of similar material to A, which in this instance, together with A′, composes the tire. The interior diameter of the outer tube being the same as the exterior diameter of the inner tube causes them, when inclosed one within the other, to lie closely together without any interspace.

As stated, more than two tubes may be employed, if desired, and these partly or wholly secured together into an outer and inner tube group—as, for instance, by cement or other glutinous or adhesive material—this although I prefer that they should be independent, in order that each tube may be free to creep independently of the other—that is to say, one tube within the other throughout the series.

The tire as a whole is secured to the felly B by being sprung into a groove formed in the outer face of the felly; or it may be secured solidly therein by means of cement or other glutinous or adhesive material.

In order to inflate the tire after having been secured to place in the grooved felly B, a tube C, with a cock D, may be fitted into the felly and passed through into the interior of the inner tube A′ of the tire of impervious material made fluid-tight, and the liquid or fluid employed for the inflation thereof forced in the same through the tube by opening the stop-cock D, thereby maintaining a cylindriform contour of the tire for an indefinite period. The degree of compressibility may be regulated by the degree of inflation or the tension of the inflating medium, which, however, may be introduced under pressure.

Various materials may be employed for the formation of the tubes constituting the tire—such, for instance, as leather, woven or textile fabrics suitably treated for rendering them impervious to liquids or fluids; but I prefer to form them of rubber, because of its adaptability for the purpose, and also from the standpoint of cheapness or economy.

The particular advantage incident to the use of such a tire, in addition to being tough and durable, is that it is exceptionally flexible, and hence in use less liable to be cut by contact with stones or other projections of the roadways, and, moreover, it is capable of better withstanding friction, abrasion, and rough usage of wear, to which such tires are subjected, especially in their application to the road-wheels of bicycles, tricycles, or velocipedes in their several varieties.

Having thus described the nature and objects of my invention, what I claim as new, and desire to secure by Letters Patent, is—

1. An inflated tire composed of two or more tubes closely fitted into or nested within each other, said tubes having smooth contact surfaces and the outermost of them formed upon its tread portion without seam or joint, substantially as and for the purposes hereinbefore described.

2. An inflated tire composed of two or more tubes closely fitted into or nested within each other, said tubes having smooth contact surfaces and being free to creep the one with respect to the other and the outermost tube made wholly or in part of tougher material than the inner tube or tubes, and also being upon its tread portion without seam or joint, substantially as and for the purposes hereinbefore described.

3. In combination with an inflatable tire composed of two or more elastic or compressible tubes fitted or meshed within each other with smooth contact surfaces, the inner tube being fluid or air tight, and the outermost of them formed without seam or joint upon its tread portion, as described, a charging-tube leading to the interior of said tight inner tube, and a cock or equivalent means for stopping the same when charged, substantially as and for the purposes hereinbefore described.

4. An inflated tire composed of two or more tubes closely fitted into or nested within each other, said tubes having smooth contact surfaces and the outermost of them adapted to entirely envelop and include the inner tube or tubes, and also to have a tread portion without seam or joint, substantially as and for the purposes hereinbefore described.

AMOS W. THOMAS.

Witnesses:
LEWIS R. DICK,
JOSHUA MATLACK, Jr.